United States Patent
Nemoto et al.

(10) Patent No.: US 11,951,662 B2
(45) Date of Patent: Apr. 9, 2024

(54) FOAMED SHEET, PRODUCT, AND METHOD FOR PRODUCING FOAMED SHEET

(71) Applicants: Taichi Nemoto, Shizuoka (JP); Shizuka Hashida, Kanagawa (JP); Yoshimitsu Kumai, Kanagawa (JP); Ryo Miyakoshi, Kanagawa (JP); Tomoharu Miki, Kanagawa (JP)

(72) Inventors: Taichi Nemoto, Shizuoka (JP); Shizuka Hashida, Kanagawa (JP); Yoshimitsu Kumai, Kanagawa (JP); Ryo Miyakoshi, Kanagawa (JP); Tomoharu Miki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/533,124

(22) Filed: Nov. 23, 2021

(65) Prior Publication Data
US 2022/0161467 A1    May 26, 2022

(30) Foreign Application Priority Data

Nov. 24, 2020  (JP) .................................. 2020-194084
May 25, 2021  (JP) .................................. 2021-087826
(Continued)

(51) Int. Cl.
B29B 7/90    (2006.01)
B29C 44/02    (2006.01)
(Continued)

(52) U.S. Cl.
CPC ............ *B29C 44/3442* (2013.01); *B29B 7/90* (2013.01); *B29C 44/02* (2013.01);
(Continued)

(58) Field of Classification Search
CPC ....... B29B 7/90; B29C 44/02; B29C 44/3442; B29K 2067/046; B29K 2105/16; B29L 2007/002
See application file for complete search history.

(56) References Cited

U.S. PATENT DOCUMENTS

2007/0027247 A1    2/2007  Ueda et al.
2009/0258175 A1    10/2009 Matsuoka et al.
(Continued)

FOREIGN PATENT DOCUMENTS

CN    110615976 A    12/2019
JP    H08-120295    5/1996
(Continued)

OTHER PUBLICATIONS

Espacenet Translation of JP-2001164027-A (Year: 2023).*
(Continued)

*Primary Examiner* — David Sample
*Assistant Examiner* — Donald M Flores, Jr.
(74) *Attorney, Agent, or Firm* — XSENSUS LLP

(57) ABSTRACT

A foamed sheet including: a polylactic acid; and a filler, wherein the foamed sheet has a compressive stress of 0.2 Mpa or less when the cushioning coefficient of the foamed sheet is 10 or less; and wherein the foamed sheet has a puncture strength of 2 N or more when the sheet thickness of the foamed sheet is 2 mm.

20 Claims, 4 Drawing Sheets

(30) Foreign Application Priority Data

Sep. 28, 2021 (JP) .................................. 2021-158455
Nov. 22, 2021 (JP) .................................. 2021-189692

(51) Int. Cl.
*B29C 44/34* (2006.01)
*B29K 67/00* (2006.01)
*B29K 105/16* (2006.01)
*B29L 7/00* (2006.01)

(52) U.S. Cl.
CPC .... *B29K 2067/046* (2013.01); *B29K 2105/16* (2013.01); *B29L 2007/002* (2013.01)

(56) References Cited

U.S. PATENT DOCUMENTS

| | | | |
|---|---|---|---|
| 2011/0016780 A1* | 1/2011 | Furukawa | C08J 9/36 47/41.01 |
| 2011/0218301 A1 | 9/2011 | Nemoto et al. | |
| 2011/0218313 A1 | 9/2011 | Mase et al. | |
| 2012/0065357 A1 | 3/2012 | Yamauchi et al. | |
| 2012/0231383 A1 | 9/2012 | Santo et al. | |
| 2012/0295188 A1 | 11/2012 | Nakajima et al. | |
| 2013/0202996 A1 | 8/2013 | Yamauchi et al. | |
| 2014/0163194 A1 | 6/2014 | Nemoto et al. | |
| 2014/0200326 A1 | 7/2014 | Yamauchi et al. | |
| 2014/0213754 A1 | 7/2014 | Nemoto et al. | |
| 2014/0295169 A1 | 10/2014 | Kang et al. | |
| 2014/0296448 A1 | 10/2014 | Nemoto et al. | |
| 2014/0342286 A1 | 11/2014 | Yamauchi et al. | |
| 2014/0350209 A1 | 11/2014 | Nemoto et al. | |
| 2014/0371420 A1 | 12/2014 | Mase et al. | |
| 2015/0011724 A1 | 1/2015 | Nemoto et al. | |
| 2015/0018513 A1 | 1/2015 | Nemoto et al. | |
| 2015/0031827 A1 | 1/2015 | Nozaki et al. | |
| 2015/0141611 A1 | 5/2015 | Satoh et al. | |
| 2015/0225512 A1 | 8/2015 | Nemoto et al. | |
| 2015/0252141 A1 | 9/2015 | Osaka et al. | |
| 2015/0322201 A1 | 11/2015 | Arai et al. | |
| 2015/0329668 A1 | 11/2015 | Miyahara et al. | |
| 2015/0353677 A1 | 12/2015 | Izumi et al. | |
| 2015/0361213 A1 | 12/2015 | Kamada et al. | |
| 2015/0361214 A1 | 12/2015 | Nemoto et al. | |
| 2016/0083512 A1 | 3/2016 | Kamada et al. | |
| 2016/0194445 A1 | 7/2016 | Nemoto et al. | |
| 2016/0280849 A1 | 9/2016 | Kamada et al. | |
| 2016/0297927 A1 | 10/2016 | Izumi et al. | |
| 2020/0339806 A1 | 10/2020 | Nemoto et al. | |
| 2021/0163715 A1 | 6/2021 | Nemoto | |

FOREIGN PATENT DOCUMENTS

| | | | |
|---|---|---|---|
| JP | 2000-007816 A | | 1/2000 |
| JP | 2000007816 A | * | 1/2000 |
| JP | 2001164027 A | * | 6/2001 |
| JP | 2005-264166 A | | 9/2005 |
| JP | 2007-254522 A | | 10/2007 |
| JP | 2007254522 A | * | 10/2007 |
| JP | 2009-235316 A | | 10/2009 |
| JP | 2011-016941 A | | 1/2011 |
| JP | 2012-030571 | | 2/2012 |
| JP | 2012-196874 A | | 10/2012 |
| JP | 2013209449 A | * | 10/2013 |
| JP | 2015-083651 | | 4/2015 |
| JP | 2020164686 A | * | 10/2020 |
| JP | 2020-180254 A | | 11/2020 |
| JP | 2021-116412 | | 8/2021 |
| WO | 2020/217917 A1 | | 10/2020 |

OTHER PUBLICATIONS

Espacenet Translation of JP-2020164686-A (Year: 2023).*
Espacenet Translation of JP-2013209449-A (Year: 2023).*
Aihara et al. (JP 2000-007816 A), Jan. 2000 (EPO machine translation to English). (Year: 2000).*
Takahashi et al. (JP 2007-254522 A), Oct. 2007 (EPO machine translation to English). (Year: 2007).*
Notice of Allowance dated Aug. 16, 2022, in corresponding Japanese patent Application No. 2021-189692, 5 pages.
Submission of Publications dated Jul. 5, 2022, issued in Japanese Patent Application No. 2021-189692, 21 pages.
Extended European Search Report dated Apr. 19, 2022, in corresponding European Patent Application 21210015.0, 7 pp.
Japanese Office Action dated Apr. 19, 2022, in corresponding Japanese Patent Application 2021-189692, 4 pp.

* cited by examiner

FOAMED SHEET, PRODUCT, AND METHOD FOR PRODUCING FOAMED SHEET

CROSS-REFERENCE TO RELATED APPLICATIONS

The present application claims priority under 35 U.S.C. § 119 to Japanese Patent Application No. 2020-194084, filed Nov. 24, 2020, Japanese Patent Application No. 2021-087826, filed May 25, 2021, Japanese Patent Application No. 2021-158455, filed Sep. 28, 2021, and Japanese Patent Application No. 2021-189692, filed Nov. 22, 2021. The contents of these applications are incorporated herein by reference in their entirety.

BACKGROUND OF THE INVENTION

Field of the Invention

The disclosures herein generally relate to a foamed sheet, a product, and a method for producing a foamed sheet.

Description of the Related Art

A foamed sheet is widely used as a raw material for products (resin molded products) such as bags, and containers because it is lightweight, has excellent cushioning property, and can be easily molded into various shapes. As a material of the foamed sheet, thermoplastic resins such as a polystyrene resin, a polyolefin resin, and a polyester resin may be used.

In recent years, due to increasing environmental considerations, the use of biodegradable polymers that may be naturally decomposed is being studied among polyester resins as materials for the foamed sheet. Among them, a polylactic acid, which is a plant-derived biodegradable polymer, is being considered as a material for the foamed sheet because it has properties similar to polystyrene resins used in conventional foamed sheets, and has relatively higher melting point, toughness, transparency, chemical resistance, and the like, than other biodegradable polymers.

As a foamed sheet using the polylactic acid, for example, a biodegradable laminated resin foamed sheet is disclosed in which a biodegradable resin film made of a polylactic acid resin is laminated on one or both surfaces of a foamed base material sheet made of a polystyrene resin foamed sheet. A puncture strength of the biodegradable resin laminated foamed sheet is 7.0 N or more (see, for example, Japanese Unexamined Patent Application Publication No. 2012-030571).

In view of the above-described problem, the present invention is intended to provide a foamed sheet that has a high cushioning property and high sheet strength.

SUMMARY OF THE INVENTION

According to an embodiment, a foamed sheet includes: a polylactic acid; and a filler, wherein the foamed sheet has a compressive stress of 0.2 MPa or less when the cushioning coefficient of the foamed sheet is 10 or less; and wherein the foamed sheet has a puncture strength of 2 N or more when the sheet thickness of the foamed sheet is 2 mm.

DESCRIPTION OF THE EMBODIMENTS

Figure 1:
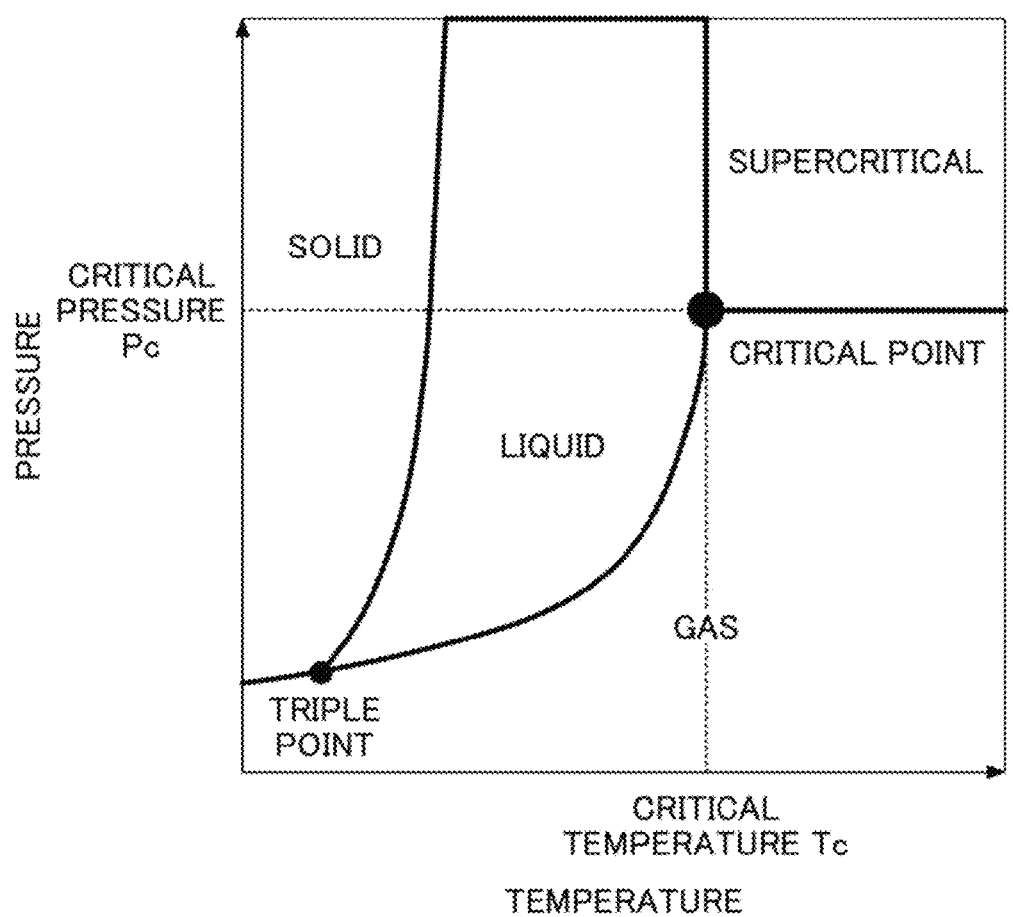
FIG. 1 is a phase diagram illustrating the state of a material with respect to temperature and pressure.

In the following, embodiments of the present invention will be described in detail. The embodiments are not limited to the following description, and can be appropriately changed without departing from the scope of the present invention. In the present description, "X1 to X2" indicates a numerical range that, unless otherwise specified, includes the numerical values described before and after the numerical range as the lower limit value and the upper limit value.

<Foamed Sheet>

According to an embodiment, a foamed sheet is a polylactic acid foamed body that is produced by foaming a composition containing a polylactic acid (a polylactic acid composition). The compressive stress of the foamed sheet is 0.2 MPa or less when the cushioning coefficient is 10 or less. The puncture strength of the foamed sheet is 2 N or more when the sheet thickness is 2 mm.

The compressive stress is determined according to the method for measuring stress-strain characteristics in compression described in JIS K 6400-2:2012 and ISO 3386-1. As described above, the cushioning coefficient is obtained according to JIS Z 0235:2002 and ISO 4651. The cushioning coefficient represents the performance of the foamed sheet according to the embodiment to absorb impact energy. The cushioning coefficient is a value obtained by dividing the compressive stress obtained by the compression test, by the compressive energy per unit volume (cushioning coefficient=compressive stress/compressive energy per unit volume).

The compressive stress can be obtained by measuring a plurality of locations (for example, three locations) of the foamed sheet according to the embodiment. The average value of the cushioning coefficients obtained by dividing each of the compressive stresses by the compressive energy may be used as the cushioning coefficient of the foamed sheet according to the embodiment.

The cushioning coefficient may be measured under each condition in which the compressive stress is more than 0.02 MPa and 0.05 MPa or less (compressive stress A), the compressive stress is more than 0.05 MPa and 0.2 MPa or less (compressive stress B), and the compressive stress is more than 0.2 MPa and 0.3 MPa or less (compressive stress C). In all conditions of compressive stress A, compressive stress B, and compressive stress C, the lower the cushioning coefficient, the better the cushioning property is exhibited.

Specifically, the compressive stress is measured as follows. As compressive stress measuring devices, the universal testing machines AG-50X and AGS-5kNX (manufactured by Shimadzu Corporation), and a 5 kN-rated calibrated load cell, are used.

A circle with a diameter of 50 mm is evenly punched or cut out, from a roll or from a sheet. When the sheet is thin, multiple sheets are stacked and then punched or cut out. The number of the stacked sheets may be determined so that the thickness of the sheets is 25 mm to 35 mm when the sheets are sandwiched between a pressure plate and a fixed support plate of the universal testing machine and a force of 2.9 N to 3.0 N is applied. The sheets that are sandwiched between a pressure plate and a fixed support plate are pressurized at a speed of (100±20) mm/min, to (40±1)% of the thickness of a test piece. In a case where the compressive stress does not reach 0.3 MPa, the amount of compression may be changed to 70% of the thickness.

The cushioning coefficient is obtained according to JIS Z 0235:2002 and ISO 4651, based on the measured value obtained by the compression. The compression is repeated three times, and the average value of the three measured values is set as the cushioning coefficient.

Compression set is obtained according to JIS K 6767: 1999 or ISO 1856. When a bulk density of the foamed sheet is 0.025 g/cm$^3$ to 0.250 g/cm$^3$, the permanent compressive stress is preferably 15% or less, and more preferably 12.5% or less. If the compression set is 15% or less, the cushioning performance can be maintained even when the foamed sheet is used repeatedly.

Specifically, the compression set is measured as follows. A test piece with a rectangular parallelepiped shape having 50 mm square and a thickness of about 25 mm in which the upper and lower surfaces are parallel, is prepared. In a case where the sample is thin, it may be stacked to be a thickness of about 25 mm. The initial thickness is measured using a caliper. Three test pieces are used. The test piece is placed on the compression device that includes two parallel flat plates with a smooth surface and sufficient thickness that does not bend even when subjected to force, and four or more bolts and nuts. The test piece is left in a state of being compressed by 25% from the initial thickness, at (23±2) ° C. and relative humidity (50±5) %, for 22 uninterrupted hours. Then, the sample (that is, the compressed test piece) is removed from the compression device, left at (23±2°) C. and relative humidity (50±5)% for 24 hours. The thickness of the sample is measured at the same place where the initial thickness is measured. The compression set may be calculated by the following formula (I).

compression set=(initial thickness−thickness after test)/initial thickness×100　　　(I)

Examples of physical property values representing strength of the foamed sheet according to the embodiment include tensile strength, flexural strength, puncture strength, and the like, of the foamed sheet. Among these, when the foamed sheet is used as a cushioning material, high puncture strength is particularly required, because it is important that the foamed sheet does not tear and the contents do not come out.

The tensile strength of the foamed sheet is obtained according to JIS K 6767:1999. The tensile strength obtained in accordance with JIS K 6767:1999 is preferably 0.3 MPa to 5.0 MPa when the bulk density of the foamed sheet is 0.025 g/cm$^3$ to 0.250 g/cm$^3$. When the tensile strength of the foamed sheet is 0.3 MPa to 5.0 MPa, it is possible to reduce problems such as tearing when the foamed sheet is used as the cushioning material.

The flexural strength (rigidity) of the foamed sheet is obtained according to JIS K 7171. The flexural strength obtained according to JIS K 7171 is preferably 50 MPa to 140 MPa, more preferably 60 MPa to 120 MPa. When the flexural strength of the foamed sheet is 50 MPa to 140 MPa, and the bulk density of the foamed sheet is 0.025 g/cm$^3$ to 0.250 g/cm$^3$, the foamed sheet can have sufficient strength, so that the foamed sheet is less likely to bend and break even when an external pressure is applied to the foamed sheet. When the bulk density of the foamed sheet is 0.5 g/cm$^3$ to 0.8 g/cm$^3$, the foamed sheet may contain fine foaming. Even in this case, when the flexural strength of the foamed sheet is 50 MPa to 140 MPa, the foamed sheet can have sufficient strength.

The puncture strength is obtained according to JIS Z 1707 using a sample in which the sheet thickness of the foamed sheet according to the embodiment is 2 mm. When the sheet thickness of the foamed sheet according to the embodiment is thin, the puncture strength may be measured by stacking a plurality of foamed sheets according to the embodiment and setting the total sheet thickness to 2 mm. When the sheet thickness of the foamed sheet is thick, the puncture strength may be measured by cutting so that the sheet thickness of the foamed sheet is 2 mm.

Specifically, the puncture strength is measured as follows. A test piece is fixed with a jig and pierced, for example, by a semi-circular needle having a diameter of 1.0 mm and a tip shape radius of 0.5 mm at a test speed of (50±5) mm/min, using the universal testing machines AG-50X and AGS-5kNX (manufactured by Shimadzu Corporation), and a 50N-rated calibrated load cell. The maximum force (unit: N) until the needle penetrates the test piece is measured. Five or more of the test pieces are used. The measurement is performed evenly over the entire width of the test piece.

In Japanese Unexamined Patent Application Publication No. 2012-030571, the cushioning property of the biodegradable laminated resin foamed sheet has not been examined. In order to use a foamed sheet containing a polylactic acid as a cushioning material, the foamed sheet needs to have a high cushioning property. It is also important that the foamed sheet has high sheet strength so that the foamed sheet is not damaged even when a protrusion or the like hits the foamed sheet.

As a result of diligent studies on foamed sheets containing a polylactic acid, the inventors of the present application focused on the compressive stress and the puncture strength of the foamed sheets. When the compressive stress of the foamed sheet containing the polylactic acid is 0.2 MPa or less when the cushioning coefficient is 10 or less, and the puncture strength of the foamed sheet containing the polylactic acid is 2 N or more when the sheet thickness is 2 mm, the foaming of the polylactic acid is fine and uniform. As a result, the foamed sheet containing the polylactic acid includes fine and uniform foaming inside, so that the cushioning property and the sheet strength are improved.

Generally, the thicker the foamed sheet, the better the cushioning property. The foamed sheet according to the embodiment can exhibit excellent cushioning property and puncture strength even when the foamed sheet is thin. Therefore, the foamed sheet according to the embodiment can achieve both the cushioning property and the sheet strength without changing the thickness.

The cushioning property of the foamed sheet according to the embodiment can be evaluated using the cushioning coefficient of the foamed sheet according to the embodiment. The sheet strength of the foamed sheet according to the embodiment can be evaluated using the puncture strength.

In the biodegradability test of biodegradable plastics obtained according to JIS K 6953-2, the number of days required for 90% biodegradation is preferably 180 days or less, more preferably 120 days or less, and even more preferably 60 days or less.

The foamed sheet according to the embodiment includes polylactic acid, and a filler, and other components as necessary. Since the foamed sheet according to the embodiment is generated from a polylactic acid composition, it is also referred to as a polylactic acid composition foamed sheet. Each component included in the foamed sheet according to the embodiment will be described.

[Polylactic Acid]

Polylactic acid is an aliphatic polyester resin, and is a polymer formed by polymerizing a lactic acid by an ester bond. Polylactic acid is used as a polymer material that is environmentally friendly and has a low environmental load, because it is biodegradable by microorganisms, in contrast with microplastics that remain in nature.

The lactic acid included in the polylactic acid may be either one or both of the D-form (D-lactic acid) and the L-form (L-lactic acid).

Examples of the polylactic acid include homopolymers of D-lactic acid, homopolymers of L-lactic acid, copolymers of D-lactic acid and L-lactic acid (DL-lactic acid); a ring-opened polymer of one or more lactides selected from the group including D-lactide, L-lactide, DL-lactide, and the like. These may be used alone or in combination of two or more. These polylactic acids may be used alone or in combination of two or more.

When a copolymer of D-lactic acid and L-lactic acid is used as the polylactic acid, the ratio of D-lactic acid and L-lactic acid is not particularly limited and can be appropriately selected depending on the intended purpose. In the D-lactic acid and L-lactic acid copolymers, when the ratio of the optical isomer with smaller ratio further decreases, the crystallinity tends to increase, and the melting point and the glass transition temperature tend to increase. When the ratio of optical isomer with smaller ratio increases, the crystallinity tends to decrease and eventually becomes amorphous. The crystallinity is related to the heat resistance of the foamed sheet and the molding temperature of foaming. The ratio may be properly set according to the application, and is not particularly limited.

The term "crystallinity" means the degree of crystallinity, and the rate of crystallization. The expression of "high crystallinity" means at least one of high crystallinity, and high crystallization rate.

The polylactic acid may be appropriately synthesized or a commercially available product, but in order to improve the cushioning performance as the cushioning material, the weight average molecular weight obtained by gel permeation chromatography (GPC) of the polylactic acid is preferably 100,000, and more preferably 150,000 or more. The upper limit of the weight average molecular weight of the polylactic acid is not particularly limited, and is preferably 350,000 or less from the viewpoint of preventing the viscosity from becoming too high and facilitating production.

The weight average molecular weight (Mw) of the foamed sheet according to the present embodiment is not particularly limited and can be appropriately selected depending on the intended purpose, and can be measured using GPC. For example, the foamed sheet according to the present embodiment is placed in a tetrahydrofuran (THF) solution and heated to 65° C. to dissolve the polylactic acid. Then, the solution is filtered through a 0.45 μm membrane filter to remove undissolved substances such as fillers contained in the THF solution. The weight average molecular weight (Mw) of the obtained foamed sheet is measured by GPC, using a calibration curve prepared with a polystyrene sample having a known molecular weight as a standard. The weight average molecular weight (Mw) of the foamed sheet may be measured, for example, based on the following measurement conditions. As the column, a column in which four TSKgel SuperHM-N (manufactured by Tosoh Corporation) are connected in series may be used.

(Measurement Condition)
  Equipment: HLC-8320 (manufactured by Tosoh Corporation)
  Column: TSKgel SuperHM-N (manufactured by Tosoh Corporation)×4
  Detector: RI
  Measurement temperature: 40° C.
  Mobile phase: tetrahydrofuran
  Flow rate: 0.6 mL/min From the viewpoint of biodegradability and recyclability, the content of the polylactic acid relative to the total amount of organic substances in the foamed sheet according to the embodiment is preferably 98% by mass or more, more preferably 99% by mass or more. When the content of the polylactic acid is 98% by mass or more, it is possible to decrease the remaining amount of other components that are not biodegraded when the polylactic acid is biodegraded.

The content of the lactic acid contained in the polylactic acid can be calculated from a ratio of materials forming the polylactic acid. When the material ratio is unknown, for example, analysis using gas chromatography-mass spectrometry (GC-MS) can be performed, and the components can be specified by comparison using known polylactic acid as a standard sample. Specifically, by using a known polylactic acid as a standard sample and obtaining a calibration curve in advance, the ratio of polylactic acid in the foamed sheet according to the embodiment can be obtained. Further, if necessary, it is also possible to calculate in combination with area ratio of the spectrum of NMR measurement and other analysis methods. When GC-MS is used, the content ratio of the polylactic acid can be measured, for example, under the following conditions.

(Measurement by GCMS)
  GCMS: QP2010 (manufactured by Shimadzu Corporation), Auxiliary Equipment Py3030D (manufactured by Frontier Lab)
  Separation column: Ultra ALLOY UA5-30M-0.25F (manufactured by Frontier Lab)
  Sample heating temperature: 300° C.
  Column oven temperature: 50° C. (holding for 1 minute), heating rate 15° C./min, 320° C. (holding for 6 minutes)
  Ionization method: Electron Ionization (EI) method
  Detected mass range: 25 to 700 (m/z)

[Filler]

A filler has a function of adjusting a size and amount of bubbles included in the foamed sheet according to the embodiment, and can be used as a foam nucleating agent. Since the foamed sheet according to the embodiment contains the filler, a foam diameter in the foamed sheet can be made fine and uniform, so that both puncture strength and cushioning property can be achieved.

As the filler, an inorganic filler, an organic filler, or the like can be used. These fillers may be used alone or in combination of two or more.

Since foaming occurs at an interface between the filler and the polylactic acid, it is preferable to disperse the filler finely and uniformly.

The content of the filler is preferably 0.1% by mass to 5.0% by mass. When the filler content is 0.1% by mass or more, the filler is able to function as a core of foaming sufficiently. When the filler content is 5.0% by mass or less, the characteristics of the foamed sheet can be maintained, e.g., sufficient impact resistance is exhibited. The content of the filler is more preferably 0.2% by mass to 4.0% by mass, and further preferably 0.3% by mass to 2.0% by mass.

Examples of the inorganic filler include talc, kaolin, calcium carbonate, layered silicate, zinc carbonate, wollastonite, silica, alumina, magnesium oxide, titanium oxide, calcium silicate, sodium aluminate, calcium aluminate, sodium aluminosilicate, magnesium silicate, glass balloon, carbon black, zinc oxide, antimony trioxide, zeolite, hydrotalcite, metal fiber, metal whisker, ceramic whisker, potassium titanate, boron nitride, graphite, glass fiber, carbon fiber, and the like.

Examples of the organic filler include naturally occurring polymers such as starch, cellulose fine particles, wood flour, okara (soy pulp), chaff, bran, and modified products thereof, sorbitol compounds, benzoic acid, and metal salts and phosphate ester metal salts thereof, and rosin compounds.

Among these, the inorganic filler is preferable because of its impact on the environment. Among the inorganic fillers, silica, titanium oxide, and layered silicate are more preferable because they can be dispersed at the nano level and bubbles can be made uniform.

[Other Ingredients]

Other ingredients are generally not particularly limited as long as they can be included in the foamed sheet and the amount added is within the range that does not affect biodegradability. They can be appropriately selected depending on the intended purpose. Examples include, but are not limited to, high molecular weight polymers such as aliphatic polyester resins other than the polylactic acid, polymethylmethacrylate resins (PMMA) added for the purpose of controlling foaming, and polystyrene, crosslinking agents, additives added for other purposes, and the like.

(Aliphatic Polyester Resins Other than Polylactic Acid)

Examples of the aliphatic polyester resins other than the polylactic acid include, polyglycolic acid, poly(3-hydroxybutyrate), poly(3-hydroxybutyrate 3-hydroxyhexanoate), poly(3-hydroxybutyrate 3-hydroxyvalerate), polycaprolactone, polybutylene succinate, poly(butylene succinate adipate), and the like. These resins may be used alone or in combination of two or more.

(Crosslinking Agent)

A crosslinking agent is not particularly limited as long as it is a compound that reacts with the hydroxyl group and/or carboxylic acid group of polylactic acid. For example, an epoxy crosslinking agent (a crosslinking agent having an epoxy group), or an isocyanate crosslinking agent (a crosslinking agent having an isocyanate group) is preferably used. As these crosslinking agents, for example, an epoxy functional (meth)acrylic-styrene crosslinking agent having two or more epoxy groups in the molecule, and polyisocyanate having two or more isocyanate groups in a molecule is preferable. The crosslinking agent is more preferably an epoxy functional (meth)acrylic-styrene crosslinking agent having three or more epoxy groups in a molecule and polyisocyanate having three or more isocyanate groups in a molecule, because by introducing a branched structure into polylactic acid, a melt strength can be efficiently improved and residues of unreacted material can be reduced. Using such a crosslinking agent, it is possible to prevent bubble coalescence and bubble breaking, thereby improving the expansion ratio.

The epoxy functional (meth)acrylic-styrene crosslinking agent having two or more epoxy groups is a polymer obtained by copolymerizing a (meth)acrylic monomer having an epoxy group with a styrene monomer.

The (meth)acrylic monomer having epoxy groups is, for example, a monomer having 1,2-epoxy groups such as glycidyl acrylate, glycidyl methacrylate, and the like. The styrene monomer is, for example, styrene, α-methylstyrene, and the like.

The epoxy functional (meth)acrylic-styrene crosslinking agent having two or more epoxy groups in a molecule may contain a (meth)acrylic monomer having no epoxy group, as a copolymerized component. Examples of such a (meth)acrylic monomer is methyl acrylate, ethyl acrylate, propyl acrylate, butyl acrylate, cyclohexyl acrylate, methyl methacrylate, ethyl methacrylate, propyl methacrylate, butyl methacrylate, cyclohexyl methacrylate, and the like.

Examples of polyisocyanate having two or more isocyanate groups in a molecule are aliphatic diisocyanates such as 1,6-hexamethylene diisocyanate, 3-isocyanate methyl-3,5,5-trimethylcyclohexyl isocyanate (isophorone diisocyanate), 1,4-tetramethylene diisocyanate, 2,4,4-trimethyl hexamethylene diisocyanate, 2,2,4-trimethyl hexamethylene diisocyanate, dicyclohexylmethane-4,4'-diisocyanate, methylcyclohexyl-2,4-diisocyanate, methylcyclohexyl-2,6-diisocyanate, xylylene diisocyanate, 1,3-bis(isocyanate)methylcyclohexane, tetramethylxylylene diisocyanate, transcyclohexane-1,4-diisocyanate, and lysine diisocyanate; alicyclic polyisocyanates such as isophorone diisocyanate, hydrogenated diphenylmethane diisocyanate, hydrogenated tlylene diisocyanate, hydrogenated xylene diisocyanate, hydrogenated tetramethylxylylene diisocyanate, and cyclohexane diisocyanate; aromatic diisocyanates such as 2,4-toluylene diisocyanate, 2,6-toluylene diisocyanate, diphenylmethane-4,4'-isocyanate, 1,5'-naphthenediisocyanate, tridine diisocyanate, diphenylmethylmethane diisocyanate, tetraalkyldiphenylmethane diisocyanate, 4,4'-dibenzyldiisocyanate, and 1,3-phenylene diisocyanate; triisocyanate compounds such as lysine ester triisocyanate, triphenylmethane triisocyanate, 1,6,11-undecane triisocyanate, 1,8-isocyanate-4,4-isocyanate methyloctane, 1,3,6-hexamethylene triisocyanate, bicycloheptane triisocyanate, an adduct product of trimethylol propane and 2,4-toluylene diisocyanate, an adduct product of trimethylol propane and diisocyanates such as 1,6-hexamethylene diisocyanate; and modified polyisocyanate compounds obtained by reacting polyhydric alcohols, such as glycerin and pentaerythritol, with aliphatic diisocyanate compounds, aromatic diisocyanate compounds, triisocyanate compounds, and the like as described above. These crosslinking agents may be used alone or in combination with two or more.

By containing a crosslinking agent, a melt tension can be improved and an expansion ratio of the foamed sheet can be adjusted. Examples of methods for improving the melt tension include dispersing of fillers such as layered silicates at nano-level, crosslinking of the resin composition using a crosslinking agent or a crosslinking aid, crosslinking of the resin composition using electrons or the like, and adding of another resin composition having a high melt tension.

(Additive)

Examples of an additive include thermal stabilizers, antioxidants, plasticizers, and the like. These additives may be used alone or in combination of two or more.

The content ratio of other ingredients is preferably 2% or less by mass, and more preferably 1% or less by mass, to the total amount of organic substances in the foamed sheet, from the viewpoint of recyclability.

In the foamed sheet according to the embodiment, it is preferable that an organic substance with a boiling point of −20° C. or higher and lower than 150° C. is substantially not included. The expression of "substantially not included" means that a detected value is equal to or less than the lower limit of an analysis apparatus, or a detected value is equal to or less than a detected value when the same detection procedure is performed with polylactic acid which is the raw material. The expression of "substantially not included" means that the content of organic compounds is substantially 0% by mass, and does not mean that the content is 0% by mass. The organic compound may be included as an unavoidable impurity, for example, in an amount of 0.1% by mass or less. Organic compounds with a boiling point of −20° C. or higher and lower than 150° C. include a volatile component. When the volatile component is a foaming agent such as an organic solvent or butane, the inclusion of the volatile component in the foamed sheet affects the dimensional stability of the foamed sheet and also affects the environment. In the foamed sheet according to the embodiment, a compound other than organic compounds such as $CO_2$ can be used as a foaming agent, and the content of volatile components can be substantially 0% by mass. Therefore, the foamed sheet according to the embodiment can be handled safely without generating odors.

<Physical Properties of Foamed Sheet>

As physical properties of the foamed sheet according to the embodiment, a bulk density, an expansion ratio, an average foam diameter, a sheet thickness, and a residual volatile component amount will be described.

(Bulk Density)

The bulk density of the foamed sheet according to the embodiment is preferably from 0.025 g/cm³ to 0.250 g/cm³, more preferably from 0.031 g/cm³ to 0.125 g/cm³, and more preferably from 0.036 g/cm³ to 0.083 g/cm³. If the bulk density is within the above-described preferred range, the foamed sheet according to the embodiment exhibits an excellent balance between sheet strength and cushioning property.

The bulk density is a density of an internal volume when the foamed sheet is filled into a container. The method for measuring the bulk density is not particularly limited, and any suitable method for measuring the bulk density can be used. For example, the bulk density can be measured as follows. The foamed sheet is left in an environment with a temperature of 23° C. and a relative humidity of 50% for at least 24 hours. Then, the external dimension of the foamed sheet is measured to determine a bulk volume, and the weight of the foamed sheet is measured. By dividing the weight of the foamed sheet by the bulk volume, the bulk density of the foamed sheet is determined.

(Expansion Ratio)

The expansion ratio of the foamed sheet according to the embodiment is preferably 5 to 50 times, more preferably 10 to 40 times, and even more preferably 15 to 35 times. If the expansion ratio is within the above-described preferred range, the foamed sheet according to the embodiment can maintain cushioning performance and strength.

The expansion ratio of the foamed sheet according to the embodiment is obtained by dividing the density (true density ρ0) of the polylactic acid composition included in the foamed sheet by the bulk density (ρ1) as in the following formula (1).

The true density is a density of raw polylactic acid. The true density may be the literature value or may be obtained by measuring a pellet of the raw material. The true density is about 1.25 g/cm³.

Expansion ratio=true density (ρ0)/bulk density (ρ1)  (1)

(Average Foam Diameter)

The average foam diameter of the foamed sheet according to the embodiment is preferably 10 μm to 200 μm, more preferably 20 μm to 100 μm, and even more preferably 30 μm to 80 μm, depending on the bulk density.

The size of the average foam diameter can be appropriately adjusted depending on, but not limited to, the filler content, the dispersion state of the foam, the melt tension of the foamed sheet, and the like. For example, when the bulk density is between 0.025 g/cm³ and 0.250 g/cm³, the average foam diameter is preferably 100 μm or less. When the bulk density is 0.025 g/cm³ or more and less than 0.062 g/cm³, the average foam diameter is preferably 200 μm or less.

Measurement methods for the average foam diameter are not particularly limited and may be selected as appropriate depending on the purpose. For example, the foamed sheet may be cross-sectionally machined using an ion milling apparatus, the cross-section is captured by a scanning electrochemical microscopy (SEM), and an image of a scanning electron micrograph is acquired. The resulting cross-sectional scanning electron micrograph (magnification is, e.g. 3000 times) is binarized into a gray component corresponding to a foam (void) and a white component corresponding to a resin component using Image-Pro Premier (manufactured by Media Cybernetics, Inc.) software. Then, the average particle diameter (Feret diameter) of the gray component corresponding to a foam within a predetermined range (e.g., 35 μm×20 μm) is obtained. The average foam diameter can be calculated by calculating the average value of only a gray component (a foam) with a Feret diameter of 0.5 μm or more.

(Sheet Thickness)

The sheet thickness of the foamed sheet according to the embodiment is preferably from 1.0 mm to 10.0 mm, more preferably from 1.5 mm to 7.0 mm, and even more preferably from 2.0 mm to 5.0 mm. When the sheet thickness is within the above-described preferred range, a foam of the foamed sheet according to the embodiment can be fine and uniform. Therefore, the foamed sheet according to the embodiment can be easily molded and exhibits sufficient cushioning property.

The sheet thickness may be an average thickness. The average thickness may be measured at multiple points on the cross-section of the foamed sheet and may be the average value of these measured thicknesses.

The compressive stress of the foamed sheet according to the embodiment is 0.2 MPa or less, and preferably 0.02 MPa to 0.1 MPa, more preferably 0.02 MPa to 0.05 MPa, when a cushioning coefficient is 10 or less. When the compressive stress is 0.2 MPa or less, the foamed sheet exhibits excellent cushioning property.

The puncture strength of the foamed sheet according to the embodiment is 2 N or greater, preferably 2.5 N to 5 N, and more preferably 3 N to 5 N when a sheet thickness is 2 mm. When the puncture strength is 2 N or more, it is possible to suppress tearing or the like due to protrusions and the like when the foamed sheet is used as a cushioning material.

<Method for Producing Foamed Sheet>

A method for producing a foamed sheet according to the embodiment includes a kneading step and a foaming step, and optionally includes other steps. In the method for producing a foamed sheet according to the embodiment, the kneading step and the foaming step may be performed simultaneously or separately.

[Kneading Step]

In the kneading step, the polylactic acid and the filler are kneaded in the presence of a compressible fluid at a temperature below the melting point of the polylactic acid. In the kneading step, it is preferable to include a foaming agent in addition to the polylactic acid and the filler to promote more efficient foaming. A mixture before foaming, which includes the polylactic acid, the filler, and the foaming agent, is also referred to as a polylactic acid composition (master batch).

(Foaming Agent)

Examples of the foaming agent include physical foaming agents which include, for example, hydrocarbons such as lower alkanes, for example, propane, n-butane, isobutane, n-pentane, isopentane, and hexane, ethers such as dimethyl ether, halogenated hydrocarbons such as methyl chloride and ethyl chloride, compressible fluids (also referred to as compressible gases) such as carbon dioxide and nitrogen. By using the above foaming agents, it is easy to obtain a foamed sheet with a high expansion ratio. Among these, the compressible fluids such as carbon dioxide and nitrogen are preferably used as the foaming agent since these have no odor, can be handled safely, and have low environmental impact. Thus, in the foamed sheet according to the embodiment, an organic substance with a boiling point of −20° C. or higher and lower than 150° C. is substantially not included. That is, the content of organic compounds with a boiling point of −20° C. or higher and lower than 150° C. is substantially 0% by mass.

Because aliphatic polyester resins such as polylactic acid have the property of sharply decreasing melt viscosity at the melting point or higher, the filler tends to aggregate being kneaded with the polylactic acid. When the filler is small, aggregation of the filler is particularly pronounced. Therefore, in the embodiment, it is preferable to perform kneading of the polylactic acid and the filler using a compressible fluid. By using the compressible fluid, the filler can be uniformly dispersed in the polylactic acid.

Preferably, the compressible fluid is the same as the foaming agent. If the compressible fluid is the same as the foaming agent, kneading and foaming of the filler can be performed in a series of processes, thereby reducing the environmental load.

The reason why it is preferable to use the compressible fluid to knead the filler and polylactic acid will be explained. In general, by using the compressible fluids, resins such as aliphatic polyester resins tend to be plasticized and melt viscosity of the resins decreases (see, "Tyourinkai ryuutai no saisin ouyou gijutu (Latest applied technology of supercritical fluid)", NTS Inc). Seemingly, a decrease in melt viscosity and an increase in kneadability are inconsistent. In fact, by applying pressure without using compressible fluids in kneading of a commonly used filler, the free volume of the resin is reduced and the interaction between the resins is increased (viscosity increase). However, resins become difficult to plasticize (see, Yang, K. and Ozisik R, R.: Polymer, 47, 2849(2006)).

It is known that a compressible liquid has the property of plasticizing (softening) a resin and the resin becomes like a liquid when the temperature of the compressible liquid is increased. If the filler is dispersed into the resin in this state, the filler behaves as it would when dispersed into a liquid, and the filler aggregates in the liquid. Therefore, it is considered that a resin composition with highly-dispersed filler cannot be obtained. In other words, it is considered difficult to use a compressible liquid for kneading a resin and a filler because the resin does not have a suitable viscosity for kneading in the presence of a compressible fluid.

The inventors of the present application investigated whether a compressible fluid can be used for kneading of polylactic acid and filler. As a result, it is found that the polylactic acid has a viscosity suitable for kneading and the filler can be kneaded with the polylactic acid, even in the presence of a compressible fluid on the condition that the temperature of the compressible fluid is lower than the melting point of the polylactic acid. In particular, previously, the polylactic acid whose melt viscosity sharply decreases at the melting point or higher is considered that it can only be kneaded at a low melt viscosity. However, in the embodiment, the filler can be kneaded with the polylactic acid being in a high-viscosity state, and the compressible fluid can be used as the foaming agent as it is.

(Compressible Fluid)

Examples of materials which can be used in the state of a compressible fluid include carbon monoxide, carbon dioxide, nitrogen monoxide, nitrogen, methane, ethane, propane, 2,3-dimethylbutane, ethylene, dimethyl ether and the like. Among these, carbon dioxide is preferable, because a critical pressure of carbon dioxide is about 7.4 MPa, and a critical temperature of carbon dioxide is about 31° C., that is, carbon dioxide easily becomes a supercritical state, and is incombustible and easy to handle. These compressible fluids may be used alone or in combination of two or more.

Figure 2:
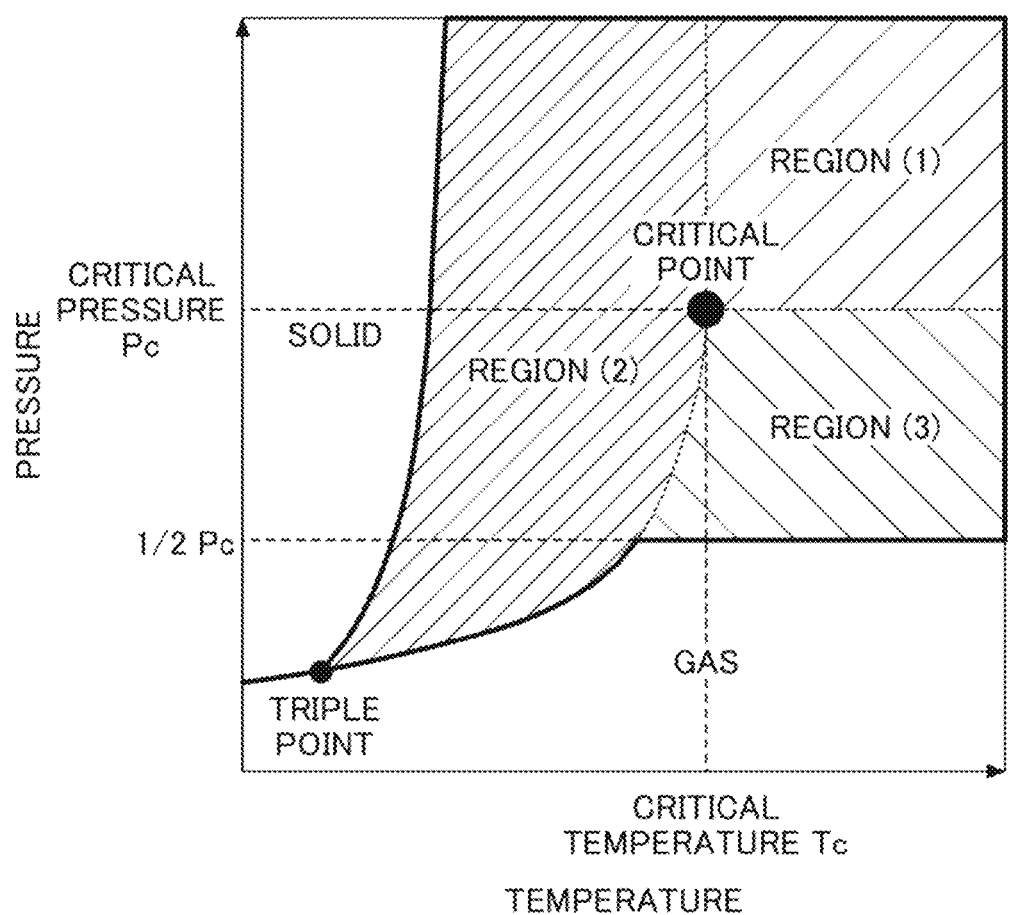
FIG. 2 is a phase diagram for defining a range of a compressible fluid.

The compressible fluid used in producing the polylactic acid resin composition will be explained with reference to FIGS. 1 and 2. FIG. 1 is a phase diagram (state diagram) illustrating a state of a material with respect to temperature and pressure. FIG. 2 is a phase diagram (state diagram) for defining a range of a compressible fluid. In the embodiment, the term "compressible fluid" means a state of a material which is in any of regions (1), (2), and (3) illustrated in FIG. 2, in the phase diagram illustrated in FIG. 1.

It is known that, in such regions, the material has very high density and the behavior of the material is different from that under normal temperature and pressure. When the state of the material is in the region (1), the material is a supercritical fluid. The supercritical fluid is a non-condensable high density fluid at temperature and pressure above the limit (critical point) at which gas and liquid can coexist, which does not condense when compressed. When the state of the material is in the region (2), the material is a liquid, which is a liquefied gas obtained by compressing the material in a gaseous state at room temperature (25° C.) and atmospheric pressure (1 atm). When the state of the material is in region (3), the material is in a gaseous state, which is a high pressure gas of which the pressure is ½ (½ Pc) or more of the critical pressure (Pc).

The amount of the compressible fluid supplied needs to be adjusted accordingly, because the solubility of the compressible fluid varies with a combination of the resin and the compressible fluid, temperature, and pressure. For example, when the compressible fluid is carbon dioxide, in the case of a combination of polylactic acid and carbon dioxide, the supply amount of carbon dioxide is preferably from 2% by mass to 30% by mass. When the supply amount of carbon dioxide is 2% by mass or more, it is possible to suppress the problem that the effect of plasticization is limited. When the supply amount of the carbon dioxide is 30% by mass or less, carbon dioxide and polylactic acid can be phase separated and the foamed sheet can have a uniform thickness.

(Kneading Apparatus)

As a kneading apparatus used in producing the polylactic acid composition, a continuous process may be employed or a batch process may be employed. It is preferable to appropriately determine a reaction process according to the equipment efficiency, characteristics and quality of the product, and the like.

Examples of the kneading device include, in view of being able to handle a viscosity suitable for kneading, a uniaxial extruder, a biaxial extruder, a needer, a non-axial basket-shaped stirring tank, Viborak (registered trademark) manufactured by Sumitomo Heavy Industries, Ltd., N-SCR manufactured by Mitsubishi Heavy Industries Co., Ltd., Glasses Wings, and Lattice Wings manufactured by Hitachi, Ltd., a tubular polymerization apparatus equipped with a Kenix-type, or a Sulzer-type SMLX static mixer, and the like. Also, examples of the kneading device include, in view of a color tone, a finisher, N-SCR, the biaxial extruder, and the like, which are self-cleaning polymerization apparatuses. Among these, the finisher, and N-SCR are preferable from the viewpoints of production efficiency, a color tone of resins, stability, and heat resistance.

Figure 3:
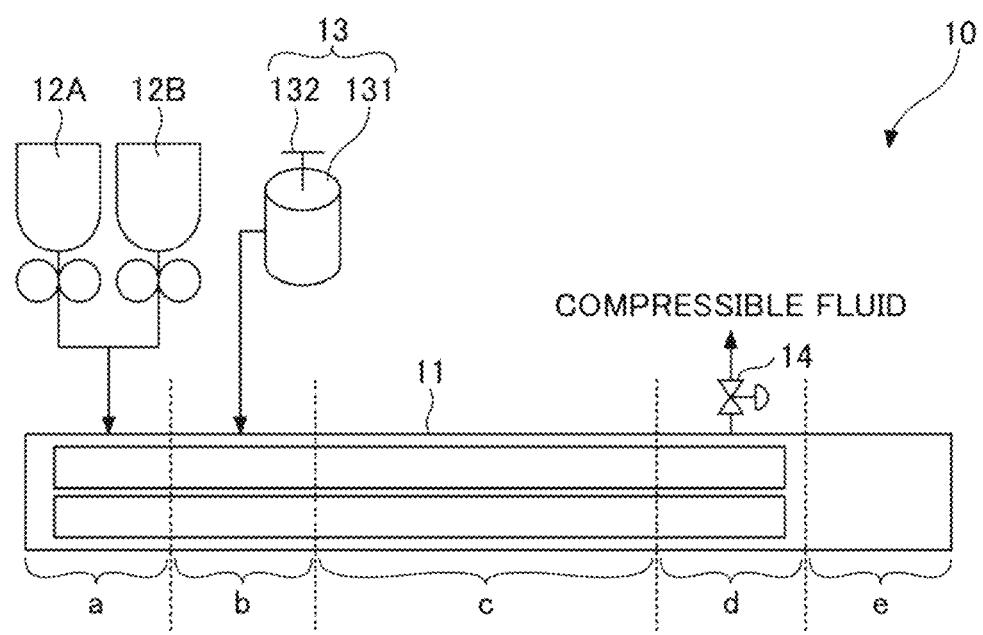
FIG. 3 is a schematic diagram illustrating an example of a continuous kneading apparatus used to produce a polylactic acid composition.

The kneading device may be a continuous kneading apparatus as illustrated in FIG. 3. FIG. 3 is a schematic diagram illustrating an example of a continuous kneading apparatus used to produce a polylactic acid composition. As illustrated in FIG. 3, a continuous kneading apparatus 10 includes an extruder 11, volumetric feeders 12A and 12B, and a gas inlet 13.

The interior of the extruder 11 includes, a raw material kneading and melting area A, a compressible fluid supply area B, a kneading area C, a compressible fluid removal area D, and a molding area E. As the extruder 11, for example, a biaxial extruder can be used. The screw diameter, and the ratio L/D of the axis diameter L relative to the screw shaft length D, of the extruder 11 can be set to any value.

The volumetric feeder 12A supplies polylactic acid, which is used as a raw material for a foamed sheet, into the raw material kneading and melting area A. The volumetric feeder 12B supplies a filler, which is used as a raw material for the foamed sheet, into the raw material kneading and melting area A.

The gas inlet 13 supplies a compressible fluid from a gas tank 131 to the compressible fluid supply area B by a metering pump 132.

The continuous kneading apparatus 10 kneads the polylactic acid and the filler with the compressible fluid in the raw material kneading and melting area A, the compressible fluid supply area B, the kneading area C, and the compressible fluid removal area D in the extruder 11 to produce a polylactic acid composition. Then, the polylactic acid composition is molded into a pellet and the like in the molding area E.

(Raw Material Kneading and Melting Area)

In the raw material kneading and melting area A, kneading and heating of the polylactic acid and the filler are performed. The heating temperature is set to the melting temperature or higher of the polylactic acid. The polylactic acid is melted, and a polylactic acid composition including the filler in the molten polylactic acid is formed. This ensures that the polylactic acid composition can be uniformly kneaded with the compressible fluid supplied into the extruder 11 in the subsequent compressible fluid supply area B.

(Compressible Fluid Supply Area)

In the compressible fluid supply area B, the compressible fluid is supplied into the extruder 11 to plasticize the molten polylactic acid contained in the polylactic acid composition.

(Kneading Area)

In the kneading area C, the temperature of the kneading area C is set so that the viscosity is suitable for kneading the filler. The set temperature varies depending on the specification of the continuous kneading apparatus 10, a type, structure, and molecular weight of the polylactic acid, and is adjusted accordingly. For example, when the weight average molecular weight Mw of polylactic acid is about 200,000, kneading is generally performed at +10° C. to +20° C. higher than the melting point of polylactic acid. On the other hand, in the embodiment, since the polylactic acid composition exhibits a relatively high viscosity even at a temperature lower than the melting point of the polylactic acid, the polylactic acid composition can be kneaded at a temperature lower than the melting point of the polylactic acid.

The temperature lower than the melting point of the polylactic acid is preferably −20° C. to −80° C. in relation to the melting point of the polylactic acid, and more preferably −30° C. to −60° C.

Since the temperature of the kneading area C can be lower than the melting point of the polylactic acid, for example, when the temperature of the raw material kneading and melting area A, the compressible fluid supply area B, and the compressible fluid removal area D are 190° C., the temperature of the kneading area C can be set to 150° C.

The set temperature may be set with reference to a current value of stirring power of the continuous kneading apparatus 10, and the like.

(Compressible Fluid Removal Area)

In the compressible fluid removal area D, a pressure valve 14 provided on the extruder 11 is opened, and the compressible fluid in the extruder 11 is discharged to the outside.

(Molding Area)

In the molding area E, the polylactic acid composition is molded into any suitable shape, such as a pellet.

The pressure in each area within the extruder 11 can be suitably set. For example, the pressure from the compressible fluid supply area B to the compressible fluid removal area D is 7 MPa.

In the embodiment, the polylactic acid composition which is molded to any suitable shape may be mixed and kneaded again with the polylactic acid to produce another polylactic acid composition, and molded. These operations may be performed using another extruder similar to the extruder 11, similarly to the raw material kneading and melting area A, the compressible fluid supply area B, the kneading area C, the compressible fluid removal area D, and the molding area E.

[Foaming Step]

The foaming step removes the compressible fluid included in the polylactic acid composition to foam the polylactic acid composition.

The compressible fluid can be removed by depressurizing the pressure in the extruder 11 of the continuous kneading apparatus 10.

It is preferable that heating is performed so that the temperature during the foaming step is the melting point of the polylactic acid or higher.

In the foaming step, foaming occurs when the compressible fluid dissolved in the polylactic acid composition evaporates and precipitates at the interface with the filler, according to the operation of changing the solubility of the compressible fluid such as depressurizing or heating. Because foaming originates from the filler, a polylactic acid foamed body having uniform and fine foaming can be formed only when the filler is uniformly dispersed in the polylactic acid.

[Other Steps]

Other steps are not particularly limited and selected according to the purpose, as long as the steps are performed in normal manufacturing of a foamed sheet. Examples of other steps include a molding step in which the polylactic acid foamed body is processed into a foamed sheet, a printing step in which a print or the like is applied to the surface of the foamed sheet, and the like.

A molding method is not particularly limited and a commonly used molding method for a thermoplastic resin can be used. Examples of a molding method includes a method in which a polylactic acid foamed body is molded into a sheet to form a foamed sheet, using a mold for vacuum molding, pressure molding, vacuum pressure molding, press molding, and the like.

In the molding step, the polylactic acid foamed body is molded into a sheet to provide a foamed sheet according to the embodiment.

The printing step is not particularly limited as long as the surface of the foamed sheet according to the embodiment is printed or the like.

A foamed sheet according to the embodiment includes polylactic acid and filler. The compressive stress of the foamed sheet is 0.2 MPa or less when the cushioning coefficient is 10 or less. The puncture strength of the foamed sheet is 2 N or more when the sheet thickness is 2 mm. This allows a fine and uniform foam to be formed in the foamed sheet. It is considered that it is difficult to make a fine and uniform foam when using the polylactic acid, because the viscosity of the polylactic acid sharply decreases around the melting point, which results in a bubble coalescence and bubble breaking easily. The foamed sheet according to the embodiment can include fine and uniform foaming on the condition that the compressive stress is 0.2 MPa or less when the cushioning coefficient is 10 or less and the puncture strength is 2 N or more when the sheet thickness is 2 mm, even though the foamed sheet contains the polylactic acid. Accordingly, the foamed sheet according to the embodiment can be improved in the cushioning property and the sheet strength.

In the foamed sheet according to the embodiment, the compressive stress may be 0.05 MPa or less. Accordingly, in the foamed sheet according to the embodiment, even when the compressive stress is 0.05 MPa or less, the cushioning property is improved.

In the foamed sheet according to the embodiment, the puncture strength may be 5 N or less. Accordingly, in the foamed sheet according to the embodiment, the cushioning property is reliably maintained.

In the foamed sheet according to the embodiment, the puncture strength may be 3 N or more. Accordingly, in the foamed sheet according to the embodiment, the sheet strength is more reliably improved and maintained.

In the foamed sheet according to the embodiment, the sheet thickness may be 1 mm to 10 mm. Accordingly, in the foamed sheet according to the embodiment, the cushioning property and the sheet strength are improved.

In the foamed sheet according to the embodiment, the expansion ratio may be 5 times to 50 times. Accordingly, in the foamed sheet according to the embodiment, the cushioning property is further improved.

In the foamed sheet according to the embodiment, the bulk density may be 0.025 g/cm$^3$ to 0.250 g/cm$^3$. Accordingly, the foamed sheet according to the embodiment exhibits an excellent balance between the sheet strength and the cushioning property.

In the foamed sheet according to the embodiment, an organic substance with a boiling point of −20° C. or higher and lower than 150° C. is substantially not included. Accordingly, in the foamed sheet according to the embodiment, a compressible fluid such as $CO_2$ and $N_2$ can be used for foaming as the foaming agent. Therefore, the content of volatile components such as an organic solvent or butane, which are organic compounds with a boiling point of −20° C. or higher and lower than 150° C., can be substantially 0% by mass in the foaming agent. Therefore, the foamed sheet according to the embodiment exhibits excellent dimensional stability and can reduce the environmental load.

In the foamed sheet according to the embodiment, the content of the polylactic acid relative to the total amount of organic substances in the foamed sheet may be 98% by mass or more. Accordingly, the foamed sheet according to the embodiment can be biodegraded with high efficiency and easily recycled.

In the foamed sheet according to the embodiment, the content of the filler may be 0.1% by mass to 5.0% by mass. Accordingly, in the foamed sheet according to the embodiment, the cushioning property is further improved.

As described above, the foamed sheet according to the embodiment exhibits high cushioning property and sheet strength. The foamed sheet according to the embodiment can be suitably used as a packaging material, a cushioning material, and the like.

<Product>

A product according to the embodiment includes the foamed sheet according to the embodiment, and further includes other components as necessary. The other components are not particularly limited as long as they used in ordinary resin products, and may be selected as appropriate depending on the intended purpose.

A product (also referred to as "consumable material") according to the embodiment includes, for example, bags, packaging containers, trays, tableware, cutlery, stationery, cushioning materials, and the like as daily necessities. The concept of the product includes, as an intermediate for processing the product, not only a bulk material made from rolled sheets, and a product itself, but also a part of a product such as a tray handle, and a product with a product such as a tray with a handle attached thereto.

The bags include plastic shopping bags, shopping bags, and garbage bags.

Examples of stationery include a plastic sleeve, a patch, and the like.

Because conventional foamed sheets have a large foam diameter and a large variation, the physical properties of such sheets, for example, the strength and flexibility, may not be satisfactory. Because the product according to the embodiment has excellent physical properties, it can be applied to applications other than the above-mentioned daily necessities. For example, it can be widely applied to industrial materials, daily necessities, agricultural products, food products, pharmaceutical products, cosmetic sheets, packaging materials, and the like.

EXAMPLES

Hereinafter, embodiments will be described in more detail with reference to Examples and Comparative Examples, but the embodiments are not limited to these Examples and Comparative Examples.

Example 1

[Production of Foamed Sheet]

Figure 4:
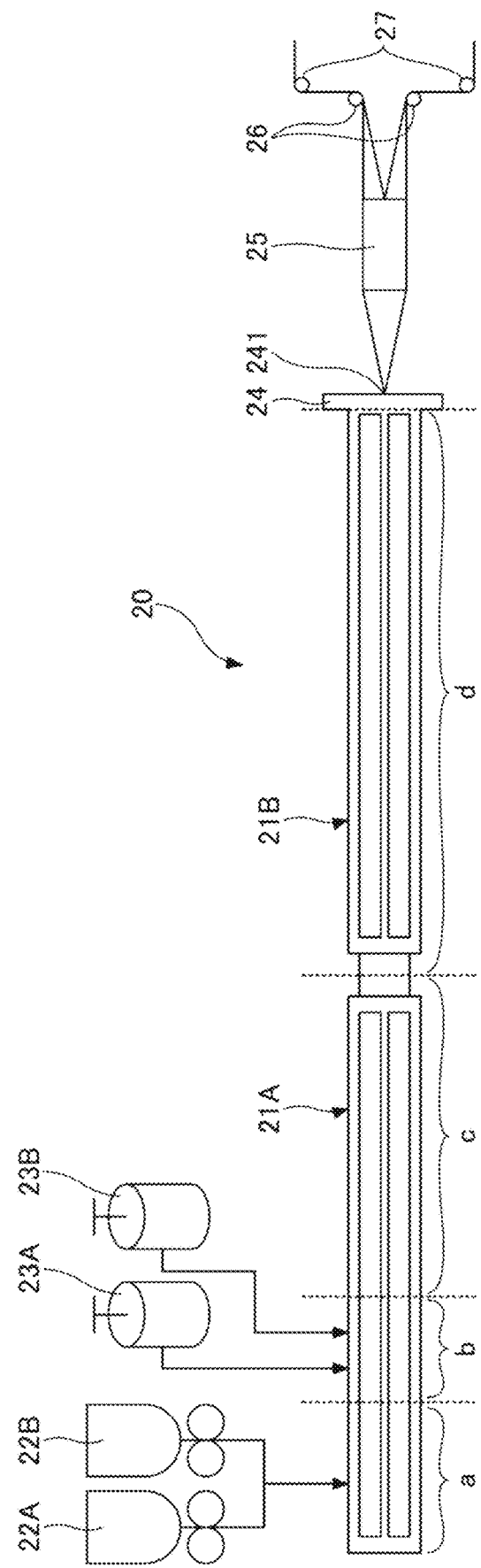
FIG. 4 is a schematic diagram illustrating an example of a continuous foamed sheet production apparatus used to produce a foamed sheet according to the present embodiment.

The foamed sheet was produced using the continuous kneading apparatus 10 illustrated in FIG. 3 and the continuous foamed sheet production apparatus illustrated in FIG. 4. The production of the foamed sheet will be described with reference to FIGS. 3 and 4.

(Production of Master Batch)

The polylactic acid composition was produced using the continuous kneading apparatus 10 illustrated in FIG. 3.

Polylactic acid (Revode 110, HISUN Inc., melting point: 160° C.) and titanium oxide (TTO-55(C), Ishihara Sangyo Co., Ltd., average particle diameter: 0.004 μm) as filler (foam nucleating agent) were supplied to the raw material kneading and melting area A so that the total flow rate of the filler was 10 kg/h. The flow rate of the polylactic acid was 9.7 kg/h and the flow rate of the filler was 0.3 kg/h. Carbon dioxide, which is a compressible fluid, was supplied to the compressible fluid supply area B at a flow rate of 0.99 kg/h (equivalent to 10% by mass with respect to the polylactic acid). The polylactic acid and the filler were then kneaded to obtain a polylactic acid composition containing 3% by mass of the filler, in the kneading area C. The compressible fluid in the extruder 11 was then evacuated, in a compressible fluid removal area D. The polylactic acid composition containing 3% by mass of the filler was extruded into strands, cooled, and pelletized with a cutter, in the molding area E. As a result, a polylactic acid foamed body (a master batch containing 3% by mass of the filler) was obtained.

The temperature of each area was set at 190° C. for the raw material kneading and melting area A and the compressible fluid supply area B, 150° C. for the kneading area C, 190° C. for the compressible fluid removal area D, and 190° C. for the molding area E.

The pressure in each area was 7.0 MPa in the compressible fluid supply area B and the kneading area C, and 0.5 MPa in the compressible fluid removal area D.

Regarding the master batch obtained, the number of coarse particles larger than 10 μm was 20 particles/g, which is determined by the following method.

Number of Coarse Particles of Filler 50 mg of the master batch was remelted to form a 10 μm thin film. The number of coarse particles of the filler having a particle size of 10 μm or more of the obtained thin film was counted with an optical microscope (FX-21, Nikon Corporation, 100-fold magnification). This procedure was performed 5 times, and the average value was taken as the number of the coarse particles of the filler.

(Production of Foamed Sheet)

The continuous foamed sheet production apparatus 20 illustrated in FIG. 4 was used. The continuous foamed sheet production apparatus 20 includes a first extruder 21A and a second extruder 21B connected in series. The master batch containing 3% by mass of the filler, which is obtained in the "Production of master batch" described above in the continuous kneading apparatus 10 illustrated in FIG. 3, was fed to the volumetric feeder 22A, and the polylactic acid (Revode 110, HISUN Inc., melting point: 160° C.) was fed to the volumetric feeder 22B. Then, the master batch containing 3% by mass of the filler and the polylactic acid were fed to the raw material kneading and melting area A of the first extruder 21A so that the total flow rate of these was 10 kg/hr. The flow rate of the master batch containing 3% by mass of the filler was 1.67 kg/h and the flow rate of the polylactic acid was 8.33 kg/h so that the flow rate of the filler was 0.5% by mass.

Next, carbon dioxide, which is a compressible fluid, was supplied from the gas inlet unit 23A to the compressible fluid supply area B at a flow rate of 0.99 kg/h (equivalent to 10% by mass with respect to the polylactic acid). Isocyanurate (Duranate TPA-100, Asahi Kasei Corporation), which is a crosslinking agent, was supplied from the gas inlet 23B at a flow rate of 0.05 kg/h (0.5% with respect to the resin).

The master batch containing 3% by mass of the filler, the polylactic acid, the crosslinking agent, and the compressible fluid were then kneaded in the kneading area C and fed to the second extruder 21B.

The mixture kneaded in the kneading area C is fed into the second extruder 21B from a circular mold (slit diameter of 70 mm) mounted to the end of the second extruder 21B, at a discharge rate of 10 kg/h. The mixture was kneaded in the second heating area D while cooling to a resin temperature of 140° C. The compressible fluid was removed from the mixture, and the mixture was extruded and foamed from a slit 241 of a circular die 24 to be a cylindrical polylactic acid foamed sheet. The polylactic acid foamed sheet was placed along a cooled mandrel 25, and air is blown from an air ring onto the outer surface of the polylactic acid foamed sheet. As a result, the polylactic acid foamed sheet was cooled and formed. The polylactic acid foamed sheet was then cut by a cutter, made into a flat sheet, passed through a roller 26, and then wound by a winding roller 27 to obtain a foamed sheet.

The temperature of each area was set at 190° C. for the raw material kneading and melting area A and the compressible fluid supply area B of the first extruder 21A, 150° C. for the kneading area C, and 140° C. for the second heating area D of the second extruder 21B.

The pressure in each area was 7.0 MPa from the compressible fluid supply area B to the second extruder heating area D.

Example 2 and 3

Foamed sheets of Examples 2 and 3 were produced in the same manner as that of Example 1, except that the content of the filler was changed to the value illustrated in Table 1.

Example 4

A foamed sheet of Example 4 was produced in the same manner as that of Example 1, except that the filler was changed to silica (QSG-30, Shin-Etsu Chemical Co., Ltd., average particle diameter: 0.004 μm).

Example 5 and 6

Foamed sheets of Examples 5 and 6 were produced in the same manner as that of Example 1, except that the crosslinking agent was changed to a crosslinking agent which contains glycidyl ester (Joncryl 4368C, BASF SE).

Example 7

A foamed sheet with 0.8 mm sheet thickness of Example 7 was produced in the same manner as that of Example 1, except that the feed was changed to 8 kg/hr.

Comparative Example 1

A foamed sheet of Comparative Example 1 was produced in the same manner as that of Example 1, except that the filler and the crosslinking agent were not included.

Comparative Example 2

A foamed sheet of Comparative Example 2 was produced in the same manner as that of Example 1, except that the filler was changed to heavy calcium carbonate (SOFTON 2200, Shiraishi Calcium Kaisha, Ltd., average particle diameter: 1.000 μm). The number average particle diameter of the filler after kneading was 0.420 μm.

Comparative Example 3

A foamed sheet of Comparative Example 3 was produced in the same manner as that of Example 5, except that the content of the crosslinking agent was changed.

Each component of the foamed sheet of each example and comparative example is illustrated in Table 1.

<Physical Property>

As the physical properties of the obtained foamed sheet, the bulk density, average foam diameter, sheet thickness, cushioning coefficient, and puncture strength were measured. The measurement results are shown in Table 1.

[Bulk Density]

The bulk volume was determined from the external dimensions of the foamed sheet which was left in an environment with a temperature of 23° C. and a relative humidity of 50% for more than 24 hours. The weight (g) of the foamed sheet was then weighed. The bulk density was obtained by dividing the weight of the foamed sheet by the bulk volume as illustrated in a formula (2) below.

$$\text{Bulk density} = \text{weight of foamed sheet/bulk volume of foamed sheet} \quad (2)$$

[Average Foam Diameter]

The obtained foamed sheet was cross-sectionally machined with an ion milling apparatus, and SEM observation of the cross-section was performed. The obtained cross-sectional SEM photographs (magnification: 3000 times) were binarized between a grey component corresponding to a foam (void) and a resin component (white) by using Image-Pro Premier (manufactured by Media Cybernetics, Inc.) software, and the average particle diameter (Feret diameter) was obtained in the range of 35 μm×20 μm. The average foam diameter was calculated for the gray component (foam) with a Feret diameter of 0.5 μm or more. The average foam diameter was the average of three foams.

[Sheet Thickness]

The obtained foamed sheet was cross-sectionally machined with an ion milling apparatus, and SEM observation of the cross-section was performed. The obtained cross-sectional SEM photographs (magnification: 100 times) were analyzed using Image-Pro Premier (manufactured by Media Cybernetics, Inc.) software. The range of 1 mm as one field of view was measured 10 times, and the average value was calculated. This process was performed in three fields of view, and the average value of the three fields of view was defined as the sheet thickness.

[Content of Residual Volatile Component]

To 1 part by mass of the obtained foamed sheet, 2 parts by mass of 2-propanol were added and dispersed by ultrasonic waves for 30 minutes. The dispersion was stored in a refrigerator at 5° C. for more than 1 day so that a volatile component in a composition was extracted. A supernatant liquid of the preserved dispersion was analyzed using a gas chromatography (GC-14A, Shimadzu Corporation), and the volatile component in the composition was quantitatively determined. As a reference, the polylactic acid resin (Revode 110) may be measured in the same manner. When the measured value is below the reference value, it is regarded as below the detection limit. When the volatile component is below the detection limit, it is evaluated as Good, and when the volatile component exceeds the detection limit, it is evaluated as No Good.

(Measurement Conditions)

Equipment: GC-14A (manufactured by Shimadzu Corporation)
Column: CBP20-M 50-0.25
Detector: FID
Injection volume: 1 μL to 5 μL
Carrier gas: He 2.5 kg/cm$^2$
Hydrogen flow rate: 0.6 kg/cm$^2$
Air flow rate: 0.5 kg/cm$^2$
Chart speed: 5 mm/min
Sensitivity: Range 101×Atten20
Column temperature: 40° C.
Injection temperature: 150° C.

[Cushioning Property]

A cushioning property of the obtained foamed sheets was assessed by cushioning coefficient. In determining the cushioning coefficient, first, the compressive stress was measured. As a compressive stress measuring device, the universal testing machine AG-50X (manufactured by Shimadzu Corporation) and a 5 kN-rated calibrated load cell, were used. A circle with a diameter of 50 mm was evenly punched from a sheet. Multiple sheets were stacked and then punched. The number of the stacked sheets was determined so that the thickness of the sheets was 25 mm to 35 mm when the sheets were sandwiched between a pressure plate and a fixed support plate of the universal testing machine and a force of 2.9 N to 3.0 N was applied. The sheets that were sandwiched between a pressure plate and a fixed support plate were pressurized at a speed of (100±20) mm/min, to (40±1)% of the thickness of a test piece. In a case where the compressive stress did not reach 0.3 MPa, the amount of compression was changed to 70% of the thickness. The cushioning coefficient was obtained according to JIS Z 0235:2002 and ISO 4651, based on the measured value obtained by the compression. The compression was repeated three times, and the average value of the three measured values was set as the cushioning coefficient. The cushioning coefficient of the foamed sheet was evaluated according to the following evaluation criteria. The cushioning coefficient was measured under each condition in which the compressive stress is more than 0.02 MPa and 0.05 MPa or less (compressive stress A), the compressive stress is more than 0.05 MPa and 0.2 MPa or less (compressive stress B), and the compressive stress is more than 0.2 MPa and 0.3 MPa or less (compressive stress C).

$$\text{Cushioning coefficient} = \text{Compressive stress/Compressive energy per unit volume} \quad (3)$$

(Evaluation Criteria)

Excellent: The cushioning coefficient is 10 or less for all of compressive stresses A, B and C.

Good: The cushioning coefficient is 10 or less for compressive stresses A and B, but not for compressive stress C.

Fair: The cushioning coefficient is 10 or less for compressive stress A, but not for compressive stresses B and C.

Bad: The cushioning coefficient is more than 10 for all of compressive stresses A, B, and C.

[Puncture Strength]

The puncture strength was determined according to JIS Z 1707, using the foamed sheet with 2 mm sheet thickness as a sample. From the puncture strength, the sheet strength of the foamed sheet was evaluated.

TABLE 1

| COMPONENT | | | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 | COMPARATIVE EXAMPLE 3 |
|---|---|---|---|---|---|---|---|---|---|---|---|---|
| POLYLACTIC ACID | | TYPE | Revode 110 | Revode 110 | Revode 110 | Revode 110 | Revode 110 | Revode 110 | Revode 110 | Revode 110 | Revode 110 | Revode 110 |
| | | POLYLACTIC ACID CONTENT RELATIVE TO TOTAL AMOUNT OF ORGANIC SUBSTANCES [%] | 99.50 | 99.50 | 99.50 | 99.50 | 99.50 | 99.00 | 99.5 | 100.00 | 96.50 | 99.75 |
| FILLER | | TYPE | TITANIUM OXIDE | TITANIUM OXIDE | TITANIUM OXIDE | SILICA | TITANIUM OXIDE | TITANIUM OXIDE | TITANIUM OXIDE | NONE | CALCIUM CARBONATE | TITANIUM OXIDE |
| | | PARTICLE DIAMETER [µm] | 0.004 | 0.004 | 0.004 | 0.004 | 0.004 | 0.004 | 0.004 | — | 1.000 | 0.004 |
| | | CONTENT [% BY MASS] | 0.5 | 1.0 | 2.0 | 0.5 | 0.5 | 0.5 | 0.5 | — | 0.5 | 0.5 |
| CROSSLINKING AGENT | | TYPE | ISOCYANURATE | ISOCYANURATE | ISOCYANURATE | ISOCYANURATE | GLYCIDYL | GLYCIDYL | ISOCYANURATE | NONE | ISOCYANURATE | GLYCIDYL |
| | | CONTENT [% BY MASS] | 0.5 | 0.5 | 0.5 | 0.5 | 0.5 | 1.0 | 1.3 | — | 0.5 | 0.2 |
| PHYSICAL PROPERTY | | BULK DENSITY [g/cm³] | 0.063 | 0.050 | 0.078 | 0.069 | 0.057 | 0.042 | 0.125 | 0.313 | 0.066 | 0.104 |
| | | AVERAGE FOAM DIAMETER [µm] | 80 | 62 | 72 | 45 | 60 | 65 | 60 | 150 | 250 | 180 |
| | | SHEET THICKNESS [mm] | 2 | 2 | 2 | 2 | 2 | 2 | 0.8 | 2 | 2 | 2 |
| | | RESIDUAL VOLATILE COMPONENT AMOUNT | GOOD | GOOD | GOOD | GOOD | GOOD | GOOD | GOOD | GOOD | GOOD | GOOD |
| | | CUSHIONING PROPERTY | GOOD | EXCELLENT | GOOD | GOOD | GOOD | EXCELLENT | GOOD | BAD | FAIR | BAD |
| | | PUNCTURE STRENGTH [N] | 2.8 | 3.4 | 2.6 | 2.4 | 2.8 | 3.2 | 2.1 | 3.2 | 1.4 | 2.2 |

According to Table 1, the foamed sheets obtained in Examples 1 to 6 satisfied both the conditions, described above, for puncture strength (2 N or more) and cushioning property (Excellent or Good). On the other hand, the foamed sheets obtained in Comparative Examples 1 to 3 failed to satisfy at least one of the conditions of the puncture strength and the cushioning property, such that unacceptable quality deterioration occurred. It is confirmed that at least part of the required properties are not satisfied when the foamed sheets obtained in Comparative Examples 1 to 3 are used, and the foamed sheets obtained in Comparative Examples 1 to 3 have practical problems.

Unlike the foamed sheets of Comparative Examples 1 to 3, the foamed sheets of Examples 1 to 6 have the compressive stress of 0.2 MPa or less when the cushioning coefficient is 10 or less, and have the puncture strength of 2.4 N or more obtained according to JIS Z 1707 when the sheet thickness is 2 mm. This allows the foamed sheet of Examples 1 to 6 to have excellent cushioning property and sheet strength.

Although the embodiments have been described above, the embodiments are presented by way of example and the present invention is not limited to the embodiments. The embodiments can be implemented in various other forms, and various combinations, omissions, replacements, and changes can be made without departing from the gist of the present invention. These embodiments and modifications thereof are included in the scope of the present invention and are included in the scope of the invention described in the claims and equivalents thereof.

According to at least one embodiment, a foamed sheet that is capable of exhibit high cushioning property and sheet strength is provided.

What is claimed is:

1. A foamed sheet comprising:
    a polylactic acid; and
    a filler, wherein
    the foamed sheet when measured at a compressive stress of 0.2 MPa or less has a cushioning coefficient of 10 or less, and
    the foamed sheet measured at a thickness of 2 mm has a puncture strength of 2 N or more.
2. The foamed sheet according to claim 1, wherein the compressive stress is 0.05 MPa or less.
3. The foamed sheet according to claim 1, wherein the puncture strength is 5 N or less.
4. The foamed sheet according to claim 1, wherein the puncture strength is 3 N or more.
5. The foamed sheet according to claim 1, wherein the sheet thickness is 1 mm to 10 mm.
6. The foamed sheet according to claim 1, wherein the foamed sheet has a bulk density of 0.025 g/cm$^3$ to 0.250 g/cm$^3$.
7. The foamed sheet according to claim 1, wherein the foamed sheet substantially does not include an organic substance with a boiling point of −20° C. or higher and lower than 150° C.
8. The foamed sheet according to claim 1, wherein a content of the polylactic acid relative to a total amount of organic substances in the foamed sheet is 98% by mass or more.
9. The foamed sheet according to claim 1, wherein a content of the filler in the foamed sheet is 0.1% by mass to 5.0% by mass.
10. A product comprising the foamed sheet of claim 1.
11. The product according to claim 10, wherein the product is at least one selected from bags, packaging containers, tableware, cutlery, stationery, and cushioning materials.
12. The foamed sheet according to claim 1, wherein the filler is uniformly dispersed.
13. The foamed sheet according to claim 1, wherein a foam diameter of the foamed sheet is fine and uniform.
14. The foamed sheet according to claim 1, wherein an expansion ratio of the foamed sheet is 5 to 50 times.
15. The foamed sheet according to claim 1, wherein an expansion ratio of the foamed sheet is 10 to 40 times.
16. The foamed sheet according to claim 1, wherein an expansion ratio of the foamed sheet is 15 to 35 times.
17. The foamed sheet according to claim 1, wherein an average foam diameter of the foamed sheet is 100 μm or less.
18. The foamed sheet according to claim 1, wherein an average foam diameter of the foamed sheet is 20 μm or more and 100 μm or less.
19. A product, comprising:
    a polylactic acid; and
    a filler, wherein
    the product when measured at a compressive stress of 0.2 MPa or less has a cushioning coefficient of 10 or less, and
    the product measured at a thickness of 2 mm has a puncture strength of 2 N or more.
20. The product of claim 19, wherein the filler is uniformly dispersed.

* * * * *